United States Patent [19]

Kikuchi

[11] Patent Number: 5,506,375
[45] Date of Patent: Apr. 9, 1996

[54] CIRCUIT BOARD FOR COORDINATE DETECTING APPARATUS WITH NOISE SUPPRESSION

[75] Inventor: Tomoko Kikuchi, Saitama, Japan

[73] Assignee: Wacom Co., Ltd., Saitama, Japan

[21] Appl. No.: 24,170

[22] Filed: Feb. 22, 1993

[51] Int. Cl.$^6$ .............................. G08C 21/00; G09G 3/02
[52] U.S. Cl. .................. 178/18; 178/19; 178/20; 345/156; 345/158
[58] Field of Search ................. 178/18, 19, 20; 345/156, 158

[56] References Cited

U.S. PATENT DOCUMENTS

| | | | |
|---|---|---|---|
| 4,081,603 | 3/1978 | Davis | 178/19 |
| 4,138,592 | 2/1979 | Capehart | 178/19 |
| 4,210,775 | 7/1980 | Rodgers | 178/19 |
| 4,477,877 | 10/1984 | Nakamura | 178/19 |
| 4,582,955 | 4/1986 | Blesser | 178/19 |
| 4,617,515 | 10/1986 | Taguchi et al. | 178/18 |
| 4,649,232 | 3/1987 | Nakamura | 178/18 |
| 4,679,241 | 7/1987 | Lukis | 178/19 |
| 4,705,919 | 11/1987 | Dhawan | 178/19 |
| 4,794,209 | 12/1988 | Asada et al. | 178/19 |
| 4,795,858 | 1/1989 | Yamazaki | 178/19 |
| 4,806,708 | 2/1989 | Yahagi | 178/19 |
| 4,818,851 | 4/1989 | Kimura | 178/19 |
| 4,878,553 | 11/1989 | Yamanami et al. | 178/18 |
| 4,956,526 | 9/1990 | Murakami | 178/18 |
| 4,959,805 | 9/1990 | Ohouchi et al. | 178/18 |
| 4,988,837 | 1/1991 | Murakami et al. | 178/18 |
| 5,231,381 | 7/1993 | Duwaer | 178/19 |

FOREIGN PATENT DOCUMENTS 2-01397  10/1990  Japan .

*Primary Examiner*—Stephen Chin
*Assistant Examiner*—Vijay Shankar
*Attorney, Agent, or Firm*—Lowe, Price, LeBlanc & Becker

[57] ABSTRACT

A multilayer circuit board for a coordinate detecting apparatus has a sensor region having X-coordinate sensor lines which are equidistantly arranged in parallel and Y-coordinate sensor lines which are also equidistantly arranged in parallel; a processing circuit is in a periphery of the board. A first layer has signal lines which constitute the processing circuit. A second layer has grounded dummy sensor lines in a position corresponding to the signal lines on the first layer. The X and Y dummy sensor lines intersect to form mesh grounds on the second layer and cover the signal lines. Optionally, the mesh grounds are formed on a third layer, and the first layer is sandwiched between the second and third layers. The dummy sensor lines or the mesh grounds substantially block propagation of noise produced by the circuit board and help increase the size of the sensor region effective area.

26 Claims, 4 Drawing Sheets

CIRCUIT BOARD FOR COORDINATE DETECTING APPARATUS WITH NOISE SUPPRESSION

BACKGROUND OF THE INVENTION

1. Field of the Invention

The present invention relates to a coordinate detecting apparatus used as an input unit of a computer and, more particularly, to a circuit board for an electromagnetic induction type coordinate detecting apparatus and a coordinate detecting apparatus employing the same.

2. Description of the Related Art

A conventional coordinate detecting apparatus, generally called a "digitizer tablet", has a surface for detecting coordinates. When an operator points to a position on the coordinate detecting surface with a position pointing device, the apparatus detects the position pointed to, generates coordinate data corresponding to the position, and sends the data to an external unit such as a computer.

Such a coordinate detecting apparatus requires substantial reduction of noise which is produced by the processing circuit thereof because of two main reasons. Firstly, such noise may adversely affect other electronic apparatus or the like. Secondly, noise produced by the processing circuit may adversely affect the sensor region of the coordinate detecting apparatus and thus impede enhancement of the performance characteristics of the apparatus such as precision.

Reduction of electromagnetic wave noise is particularly critical in an electromagnetic induction type coordinate detecting apparatus, because this type of detecting apparatus detects the position pointed to by a position pointing device, by detecting alternating field.

The circuit board of an electromagnetic induction type coordinate detecting apparatus can be considered to consist of a sensor region and a processing circuit. The sensor region means a region of the circuit board which is provided corresponding to an effective area of the coordinate detection surface (an area in which reliable performance, such as a certain level of coordinate detection precision, is obtained), for example, a region in which a loop coil is composed of a group of sensor lines which are arranged along X axis and Y axis. The processing circuit includes: a circuit for supplying power to the sensor region; a circuit for coordinate calculation; and a controlling circuit. The sensor region and the processing circuit may be formed together on a single printed circuit board or separately on different printed circuit boards.

If at least the processing circuit of a circuit board is composed of a multi-layer board, electromagnetic wave noise, particularly the noise produced by signal lines (pattern) which connect devices, can be reduced by sandwiching the signal lines with solid-patch grounds for shielding. "Sandwiching the signal lines with solid-patch grounds" means, for example, a process in which plate-like grounds having certain areas are provided on the first and third layers of a three-layer circuit board, and signal lines are provided in a corresponding area of the second layer, that is, the layer between the first and third layers. The number of layers in this patent application is not literally the number of layers composing a circuit board but the number of conductive pattern planes.

Although solid-patch grounds are able to substantially block propagation of electromagnetic wave noise from the processing circuit to the sensor region, use of the solid-patch ground gives rise to another problem. Because the solid-patch grounds substantially prevent transmission of magnetic flux, the level of magnetic flux becomes lower in a portion close to the solid-patch grounds than in a portion far from the solid-patch grounds. The fluctuation of the level of magnetic flux adversely affects precision of coordinate detection because an electromagnetic induction type coordinate detecting apparatus detects magnetic flux passing through the sensor region and thus generates electric signals.

Further, because the conditions for magnetic flux transmission differ, in principle, from an edge portion to a central portion of the sensor region in an electromagnetic induction type coordinate detecting apparatus, the effective area of the coordinate detection surface inevitably becomes substantially smaller than the entire sensor region. This is particularly disadvantageous for a small-size coordinate detecting apparatus.

SUMMARY OF THE INVENTION

The present inventors tried to expand the effective area to substantially the same size as the sensor region, in other words, to make the conditions for magnetic flux transmission in an edge portion of the sensor region substantially the same as the conditions in a central portion thereof, by providing an area surrounding the sensor region with sensor lines which are similar to the sensor lines in the sensor region but are not used for coordinate detection (referred to as "dummy sensor lines" hereinafter). Not only have they succeeded in this attempt, but they have found that the above construction can also eliminate the problems caused by the solid-patch grounds.

Accordingly, an object of the present invention is to reduce noise produced by the circuit board, particularly, the processing circuit thereof, without adversely affecting the performance of the coordinate detecting apparatus. Another object of the present invention is to expand the effective area to the largest possible size, particularly in a small-size coordinate detecting apparatus.

To achieve the above objects, the present invention provides a circuit board for a coordinate detecting apparatus, comprising: a sensor region comprising X-coordinate sensor lines for detecting an X coordinate which sensor lines are arranged in parallel leaving a predetermined interval between two neighboring X-coordinate sensor lines, and Y-coordinate sensor lines for detecting a Y-coordinate which sensor lines are arranged in parallel leaving a predetermined interval between two neighboring Y-coordinate sensor lines, the Y-coordinate sensor lines being perpendicular to the X-coordinate sensor lines; and a processing circuit for performing various processings, including detection of alternating field in the sensor region and coordinate calculation, the processing circuit being provided in a periphery of the sensor portion, wherein the circuit board is composed of a multilayer circuit board having at least two layers, and wherein a signal line which constitutes the processing circuit is provided on a first layer of the multilayer circuit board, and wherein dummy sensor lines which are electrically conductive and not used for coordinate detection are provided in a portion of a second layer, the portion corresponding to the signal lines provided on the first layer, and the dummy sensor lines consisting of X dummy sensor lines extending parallel to the X-coordinate sensor lines, leaving the same intervals as the intervals of the X-coordinate sensor lines, and/or Y dummy sensor lines extending parallel with the Y-coordinate sensor lines, leaving the same intervals as the intervals of the Y-coordinate sensor lines.

Preferably, the dummy sensor lines should be grounded.

Further, it is preferable that both the X dummy sensor lines and the Y dummy sensor lines should intersect with each other so as to form on the second layer a mesh ground composed of column grounded lines which are equidistantly arranged in parallel and row grounded lines which are equidistantly arranged in parallel and which intersect rectangularly with the column grounded lines.

Optionally, the mesh ground is formed in a portion of the second layer, the portion corresponding to the signal lines provided on the first layer, so that the mesh ground covers the signal lines.

Further optionally, the circuit board is composed of at least three layers. The mesh ground is formed on a third layer, and the first layer is sandwiched between the second layer and the third layer.

The dummy sensor lines according to the present invention substantially equalize the conditions for magnetic flux transmission in an edge portion of the sensor region to those conditions in a central portion thereof. Further, because the dummy sensor lines are not used for coordinate detection, they may be overlapped with the signal lines if the circuit board is composed of a multilayer board, thus saving space. In other words, the effective area for coordinate detection can be made as large as possible in the limited space inside the casing.

Because the mesh ground according to the present invention acts as shield to block radiation of electromagnetic waves produced by the processing circuit during operation of the processing circuit, the sensor region and the environment of the coordinate detecting circuit can be protected from the electromagnetic wave noise. Further, unlike the solid-patch grounds according to the related art, the mesh ground has no adverse effects on precision of coordinate detection, because the mesh ground acts as dummy sensor lines and thus transmits magnetic flux about as easily as the sensor region.

Further objects, features and advantages of the present invention will become apparent from the following description of the invention with reference to the attached drawings.

DETAILED DESCRIPTION OF THE PREFERRED EMBODIMENTS

The preferred embodiments of the present invention will be described hereinafter with reference to the drawings.

Figure 1A:
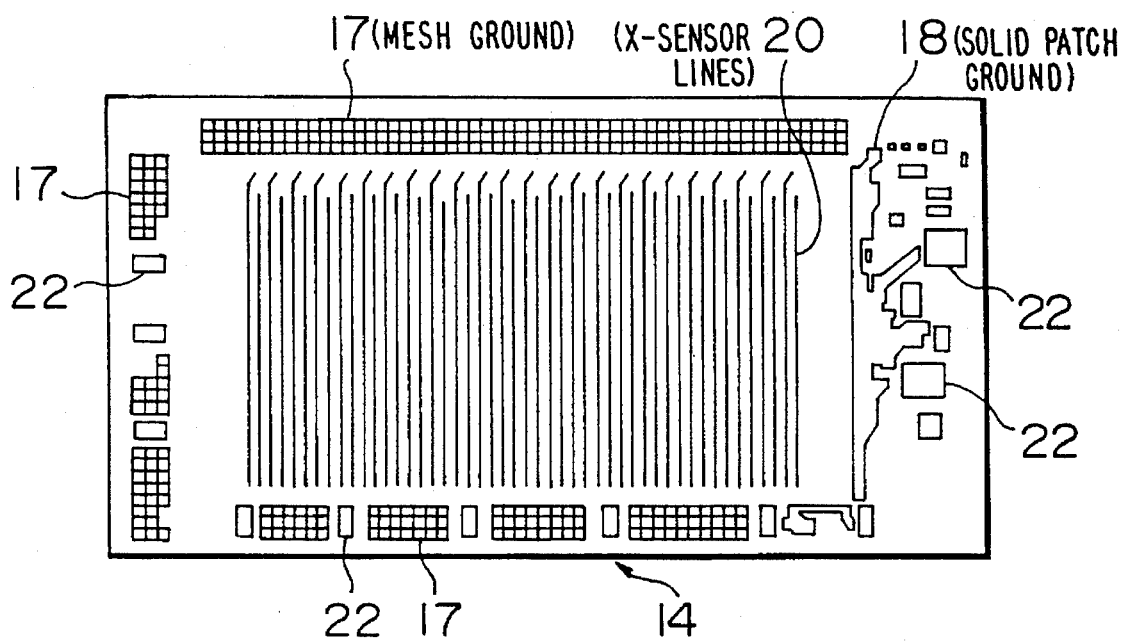
FIGS. 1a and 1b are illustrations of the patterns of a second layer and a first layer, respectively, of a multilayer circuit board of the circuit board of the present invention.
Figure 1B:
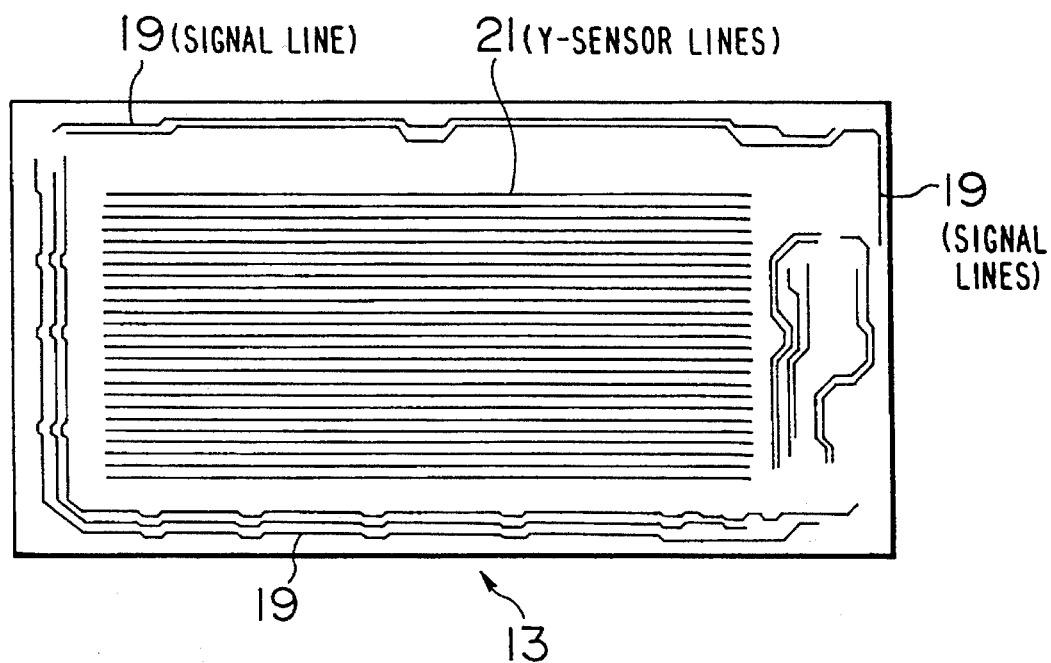

FIGS. 1a and 1b are illustrations of the patterns of a second layer and a first layer of many layers composing a circuit board according to the present invention. The circuit may be constructed according to U.S. Pat. No. 4,878,553 (titled as "POSITION DETECTING APPARATUS") issued to the present assignee or a PCT application to the Japanese Patent Office (JP90/01397), the PCT application designating countries including the United States, or other known art.

An embodiment of the circuit board of the present invention may be formed of a glass/epoxy printed circuit board (a multilayer board having more than one layer). As mentioned in the Description of the Related Art, it can be considered that the circuit board for a coordinate detecting apparatus consists of a sensor region and a processing circuit region. The sensor region contains two groups of sensor lines. The sensor lines of each group are arranged in parallel leaving a predetermined interval between two neighboring lines. The sensor lines of one group are perpendicular to the sensor lines of the other group. Thus, one group of sensor lines is used to detect X coordinates, and the other group of sensor lines is used to detect Y coordinates. In an embodiment as shown in FIGS. 1a and 1b, the X-coordinate detecting sensor lines 20 are provided on a second layer 14, and the Y-coordinate detecting sensor lines 21 are provided on a first layer 13. Because, as disclosed in U.S. Pat. No. 4,878,553 ("POSITION DETECTING APPARATUS"), the X-coordinate detecting sensor lines 20 and the Y-coordinate detecting sensor lines 21 must be electrically insulated from each other, a multilayer circuit board having at least two layers is used to form the circuit board.

The processing circuit region includes: a circuit for supplying power to the sensor region; a circuit for coordinate calculation; and a control circuit, as mentioned in the Description of the Related Art. According to the embodiment shown in FIGS. 1a and 1b, the entire processing circuit region is provided on the same circuit board as the sensor region. However, a portion of the processing circuit may be provided on a different board. In such a case, dummy sensor lines and/or mesh grounds 17 according to the present invention will have effects on a portion of the processing circuit which comes close to the sensor region when assembled into a coordinate detecting apparatus, in substantially the same manner as described below.

As shown in FIGS. 1b, the first layer carries signal lines 19 provided near the sensor region. Mesh grounds 17 are provided in portions of the second layers, the portions corresponding to the signal lines, as shown in FIG. 1a. The mesh grounds 17 are ground patterns composed of row and column ground lines intersecting so as to form a matrix. The term "intersecting" means that the row and column ground lines are electro-conductively interconnected. However, the ground lines are not necessarily electro-conductively connected at every intersection. Therefore, more specifically, it means that the ground lines may be electrically connected, in contrast with the requirement that the X-coordinate detecting sensor lines 20 and the Y-coordinate detecting sensor lines 21 be electrically disconnected from each other. Therefore, the row and column ground lines can be provided on the same layer. Experiments have shown that it is preferable that the directions of the ground lines be the same as the directions of the sensor lines and the interval between two neighboring ground lines be equal to the interval between two neighboring sensor lines. This is probably because the mesh grounds act also as dummy sensor lines. In fact, the present inventors have observed that detection precision is enhanced by providing only row or column ground lines to form a mesh ground.

The second layer 14 as shown in FIG. 1a is laminated on the first layer 13 as shown in FIG. 1b. These layers have penetrating, i.e. through, holes to electrically connect required portions of the two layers. Although the printed circuit board is produced by the method, as described above, in which a plurality of boards having conductive patterns are laminated according to this embodiment, it may be produced by other various methods known to those skilled in the art, such as the so-called one-side double-layer board method in which two layers of conductive patterns insulated from each other are provided on one side of a board, or the so-called two-side two-layer board method in which a single layer of conductive pattern is provided on each side of a board.

The second layer 14 carries various electronic devices composing the processing circuit. These devices are packaged on the second layer 14. Although the mesh grounds 17 effectively reduce leakage of noise, particularly in adjacent portions of the sensor regions, a solid-patch ground may 18 be provided in portions where a great reduction of noise is required, such as the processing circuit and, more particularly, a portion thereof where digital signals are processed.

Figure 2:
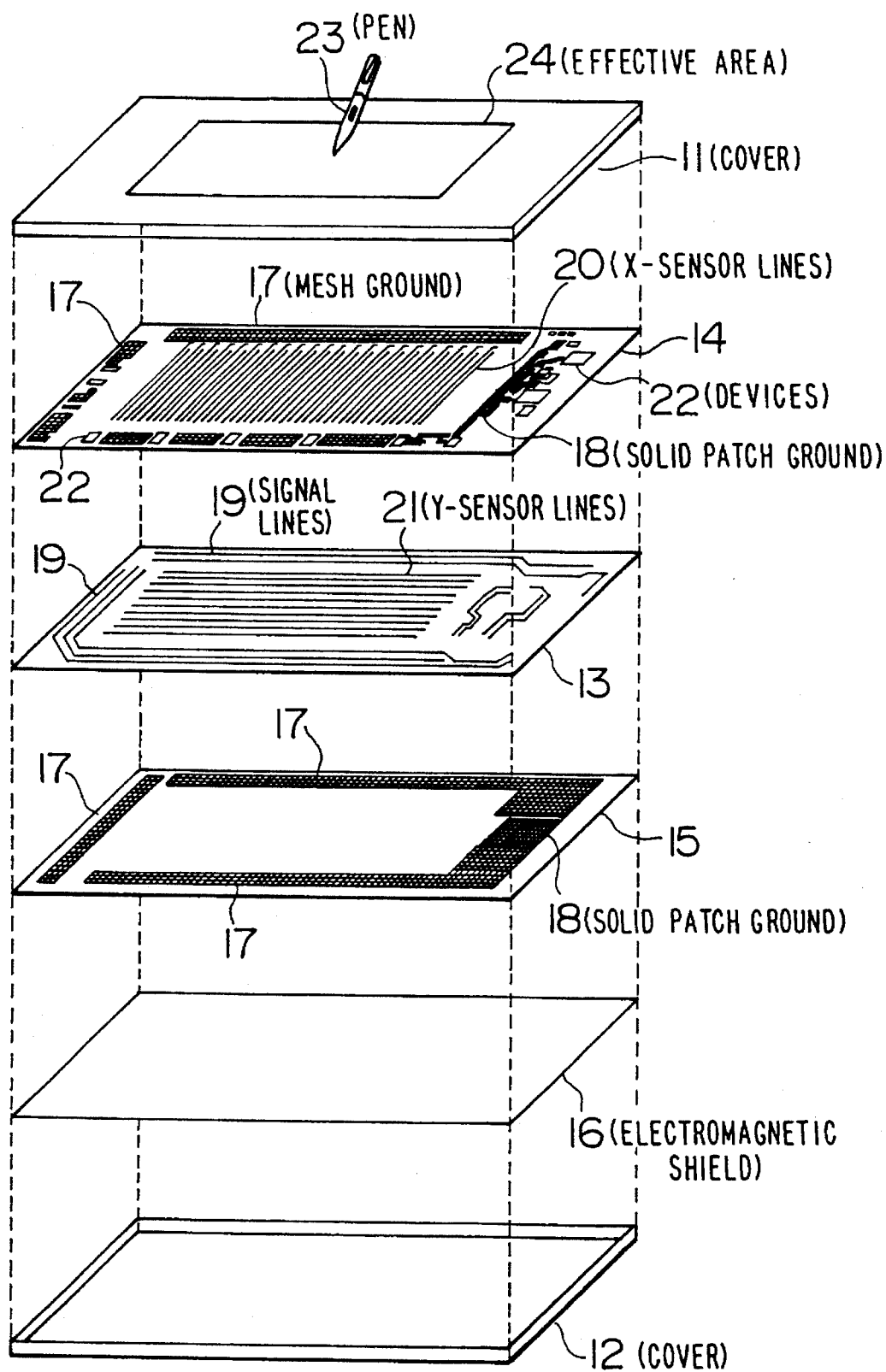
FIG. 2 is an illustration of the construction of the coordinate detecting apparatus of the present invention.

In FIG. 2 is illustrated the construction of an embodiment of the coordinate detecting apparatus of the present invention. As shown in the figure, this embodiment has a circuit board composed of three layers: a second layer 14 having mesh grounds 17, a solid-patch ground 18, X-coordinate detecting sensor lines 20 and various devices 22; a first layer 13 having signal lines 19 and Y-coordinate detecting sensor lines 21; and a third layer 15 having mesh grounds 17 and a solid-patch ground 18. If the circuit board is composed of two layers, the third layer 15 is omitted, and the signal lines 19 provided on the first layer 13 are sandwiched between the mesh grounds 17 provided on the second layer 14 and the shield plate 16. A spacer preferably provided between the first layer 13 and the shield plate 16 in order to maintain an appropriate gap therebetween. The shield plate 16 is formed of an electrically conductive material, for example, silicon steel or stainless steel, and thus prevents electromagnetic wave noise from leaking to the outside.

The mesh grounds 17 are used for the following two purposes. The first purpose is to make magnetic flux transmission conditions in an edge portion of the effective area substantially the same as in a central portion thereof. The second purpose is to substantially block propagation of noise produced by the signal lines 19. Sandwiching the signal lines 19 between the mesh grounds 17 provided on the second layer 14 and the mesh grounds 17 provided on the third layer 13 or the shield plate 16 as described above serves these two purposes. If the first purpose alone needs to be served, this sandwich construction is not required and, therefore, a layer having the signal lines 19 and a layer having the mesh grounds 17 can be arranged in various vertical positional relations. For example, the layer having the signal lines 19 may be positioned over the layer having the mesh grounds 17.

If the circuit board is composed of three layers as shown in FIG. 2, the signal lines 19 provided on the first layer 13 are sandwiched between the mesh grounds 17 provided on the second layer 14 and the mesh grounds 17 provided in substantially the same manner on the third layer 15, and the signal lines 19 are shielded with the shield plate 16. Experiments have shown that this three-layer circuit board in which the signal lines 19 are sandwiched between the mesh grounds 17 greatly contributes to an enhancement of coordinate detection precision.

Although FIG. 2 shows a construction in which the casing of the coordinate detecting apparatus 10 is composed of an upper cover 11 and a lower cover 12, the casing may be formed otherwise. For example, the casing may be formed in one body having an opening at an edge. In this case, the circuit board is slid into the casing through the opening. The coordinate detecting apparatus is provided with a cable or a connector of a cable so as to be connected to an external apparatus, although such a cable or a connector is non shown in FIG. 2.

Normally, the upper cover 11 has an indication for an effective area 24 in which the position of a position pointing device 23 can be detected by the coordinate detecting apparatus. The effective area 24 corresponds to the sensor region of the circuit board. Though the position pointing device 23 shown in FIG. 2 has a pen-shape, it may be formed in other shapes.

Figure 3A:
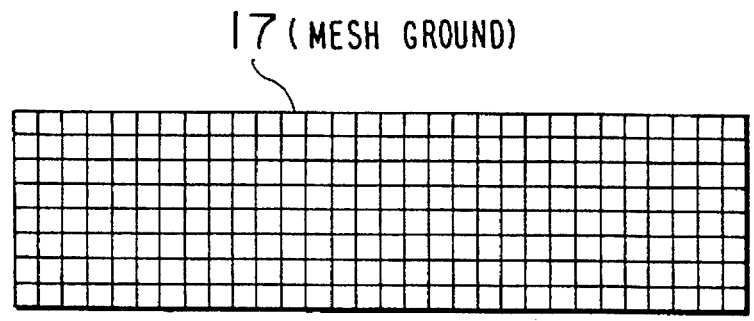
FIGS. 3a, 3b and 3c are illustrations of exemplary shapes of mesh grounds according to the present invention.
Figure 3B:
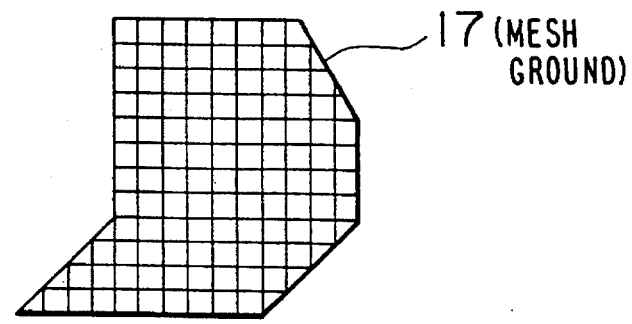
Figure 3C:
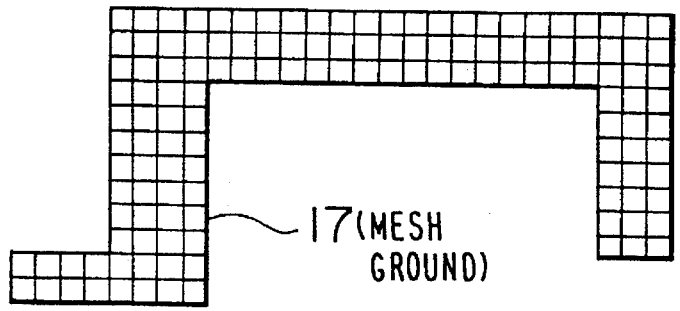

FIGS. 3a, 3b and 3c are drawings of exemplary shapes of the mesh grounds 17. Basically, a mesh ground 17 has a rectangular shape as shown in FIG. 3a, However, in order to adapt to the shapes of the patterns of other circuits, mesh grounds 17 may be formed in various shapes, for example, the shapes as shown in FIGS. 3b and 3c.

Figure 4:
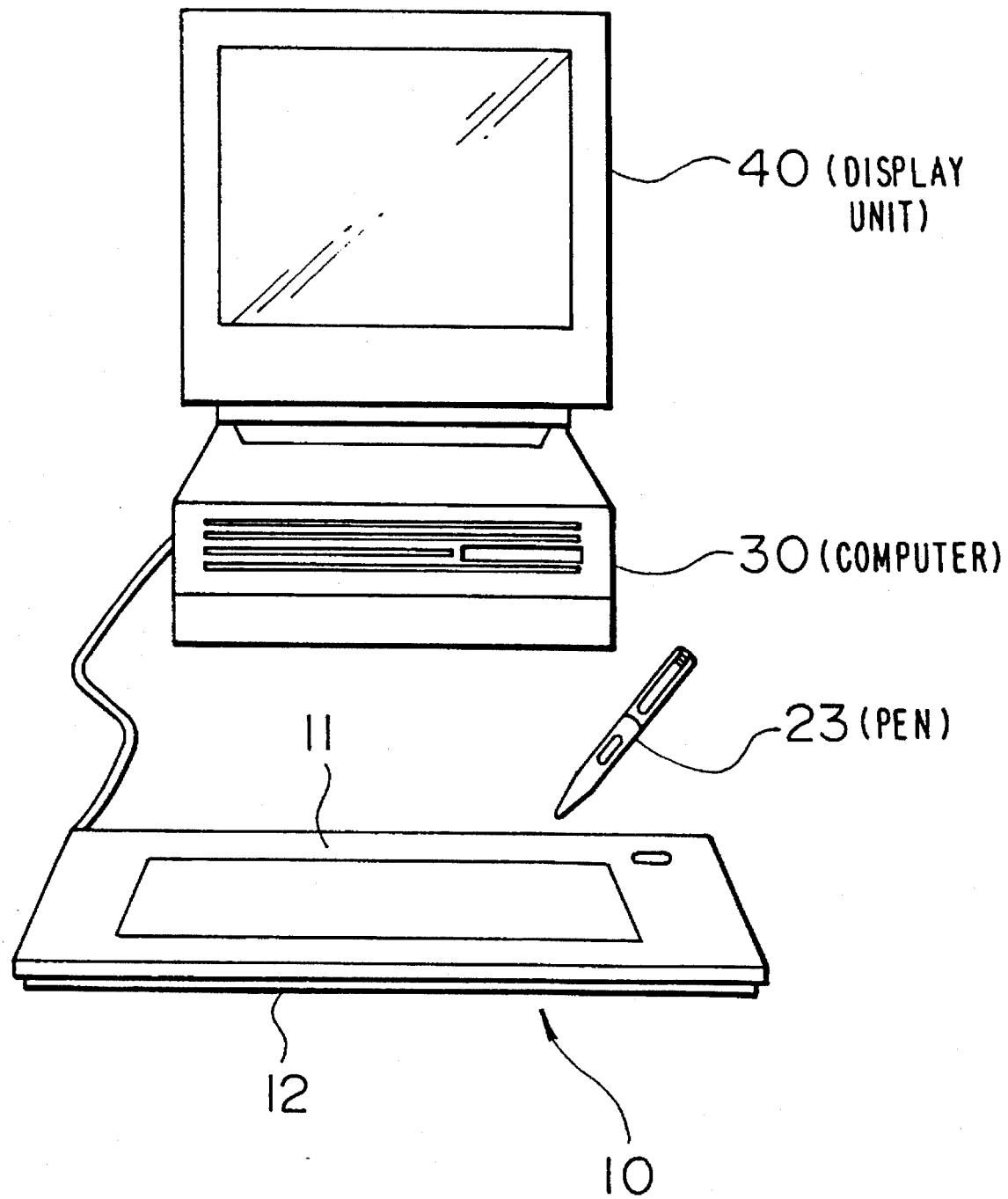
FIG. 4 is a drawing of an exemplary application of the coordinate detecting apparatus of the present invention.

FIG. 4 is a drawing of an exemplary application of a coordinate detecting apparatus. A coordinate detecting apparatus employing dummy sensor lines and/or mesh grounds in its circuit board according to the present invention can be used as an input unit of a computer 30. Though the computer 30 is a desk-top type in the figure, it may be other types. Further, a display unit 40 may be a CRT display, a liquid crystal display, or other type displays. Still further, the display unit 40 may be placed over the coordinate detecting apparatus 10 or in other manners.

As described above, the circuit board for a coordinate detecting apparatus and the coordinate detecting apparatus employing the circuit board according to the present invention achieve the following advantages:

Because the dummy sensor lines are provided, conditions for magnetic flux transmission in an edge portion of the sensor region can be made substantially the same as in a central portion thereof.

Because the dummy sensor lines and the signal lines are provided on separate layers of the multilayer circuit board, the required space is reduced. Thus, the effective area for coordinate detection can be made as large as possible in a limited space inside the casing of the coordinate detecting apparatus.

By grounding the dummy sensor lines, they substantially block propagation of noise produced by the signal lines so that such noise will not affect coordinate detection.

A mesh ground formed by providing the X dummy sensor lines and the Y dummy sensor lines on a single layer will enhance the blocking of noise produced by the signal lines.

By providing a mesh ground so as to cover the signal lines, the blocking of noise produced by the signal lines can be enhanced.

By sandwiching signal lines between mesh grounds, the blocking of noise produced by the signal lines can be enhanced.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A circuit board having at least two layers, the circuit board being arranged for a coordinate detecting apparatus, comprising:

a sensor region on the circuit board comprising X-coordinate sensor lines for detecting an X coordinate, said X-coordinate sensor lines being arranged in parallel leaving a predetermined interval between two neighboring X-coordinate sensor lines, and Y-coordinate sensor lines for detecting a Y-coordinate, said Y-coordinate sensor lines being arranged in parallel leaving a predetermined interval between two neighboring Y-coordinate sensor lines, said Y-coordinate sensor lines being perpendicular to said X-coordinate sensor lines; and a processing circuit on the circuit board for performing various processings including detection of an alternating field in said sensor region and coordinate calculation, said processing circuit being provided in a portion of the circuit board removed from said sensor region, and a signal line included in said processing circuit, the signal line being on a first layer of said multilayer circuit board, and means for substantially blocking propagation of electromagnetic wave noise between the processing circuit and the sensor region, the means for blocking including an electrically conductive dummy sensor line, the dummy sensor line not being used for coordinate detection and being provided in a portion of a second layer of said circuit board, the second layer portion corresponding to said signal line provided on said first layer, and said dummy sensor line means including X dummy sensor lines extending parallel to said X-coordinate sensor lines and having the same intervals as the intervals of said X-coordinate sensor lines, and/or Y dummy sensor lines extending parallel to said Y-coordinate sensor lines and having the same intervals as the intervals of said Y-coordinate sensor lines.

2. A circuit board for a coordinate detecting apparatus according to claim 1, wherein said dummy sensor lines are connected only to a ground terminal of said processing circuit.

3. A circuit board for a coordinate detecting apparatus according to claim 2, wherein said X dummy sensor lines and said Y dummy sensor lines intersect search other to form on said second layer a mesh ground including parallel equidistantly spaced column grounded lines and parallel equidistantly spaced row grounded lines which intersect rectangularly said column grounded lines.

4. A circuit board for a coordinate detecting apparatus according to claim 3, wherein said mesh ground is formed in a portion of said second layer, said portion corresponding to said signal line provided on said first layer, so that said mesh ground covers said signal line.

5. A circuit board for a coordinate detecting apparatus according to claim 3, wherein said circuit board is composed of at least three layers, and wherein said mesh ground is formed on a third layer, and wherein said first layer is sandwiched between said second layer and said third layer.

6. A circuit board for a coordinate detecting apparatus according to claim 4, wherein said circuit board is composed of at least three layers, and wherein said mesh ground is formed on a third layer, and wherein said first layer is sandwiched between said second layer and said third layer.

7. A coordinate detecting apparatus comprising a position pointing device, a circuit board having at least two layers, said circuit board cooperating with the position pointing device and including a sensor region comprising X-coordinate sensor lines for detecting an X coordinate, said X-coordinate sensor lines being arranged in parallel leaving a predetermined interval between two neighboring X-coordinate sensor lines, and Y-coordinate sensor lines for detecting a Y-coordinate, said Y-coordinate sensor lines being arranged in parallel leaving a predetermined interval between two neighboring Y-coordinate sensor lines, said Y-coordinate sensor lines being perpendicular to said X-coordinate sensor lines; and a processing circuit for performing various processings including detection of an alternating field resulting from the position pointing device in said sensor region and coordinate calculation, said processing circuit being provided in a periphery of said circuit board so it is removed from the sensor region, a signal line included in said processing circuit on a first layer of said circuit board, and means for substantially blocking propagation of electromagnetic wave noise between the processing circuit and the sensor region, the means for blocking including an electrically conductive dummy sensor line, the dummy sensor line not being used for coordinate detection and being provided in a portion of a second layer, the second layer portion corresponding to said signal line being on said first layer, and said dummy sensor lines including X dummy sensor lines extending parallel to said X-coordinate sensor lines and having the same intervals as the intervals of said X-coordinate sensor lines, and/or Y dummy sensor lines extending parallel to said Y-coordinate sensor lines and having the same intervals as the intervals of said Y-coordinate sensor lines.

8. A circuit board for a coordinate detecting apparatus comprising an electromagnetic induction type sensor region including two coordinate sensor lines, and processing circuitry on a peripheral portion of the circuit board removed from the sensor region electrically connected by a signal line on a surface of a circuit board to the two coordinate sensor lines, the processing circuitry deriving signals indicative of two coordinate positions of a position pointing device that interacts with sensor lines in the sensor region, and an electrically conductive dummy sensor line means for substantially blocking propagation of electromagnetic wave noise between the processing circuit and the sensor region, the dummy sensor line not being used for coordinate detection on another circuit board surface in a position corresponding to the position of the signal line.

9. A coordinate detecting apparatus comprising a position pointing device, a circuit board cooperating with the position pointing device including an electromagnetic induction type sensor region including two coordinate sensor lines, and processing circuitry on a peripheral portion of the circuit board removed from the sensor region electrically connected by a signal line on a surface of a circuit board to the two coordinate sensor lines, the processing circuitry deriving signals indicative of two coordinate positions of the position pointing device, and an electrically conductive dummy sensor line means for substantially blocking propagation of electromagnetic wave noise between the processing circuit and the sensor region, the dummy sensor line not being used for coordinate detection on another circuit board surface in a position corresponding to the position of the signal line.

10. A circuit board arrangement for a coordinate detecting apparatus comprising a two dimensional sensor on the circuit board arrangement for a position pointing device, other circuit elements on the circuit board arrangement at a region removed from the two dimensional sensor, the other circuit elements and the two dimensional sensor being positioned on the circuit board arrangement so electromagnetic wave noise has a tendency to propagate between the other circuit elements and the two dimensional sensor, and electrical conductor means on the circuit board arrangement for substantially blocking propagation of the electromagnetic wave noise between the other circuit elements and the two dimensional sensor and thereby substantially overcome said tendency and for causing an edge portion of the two dimensional sensor to provide substantially the same amount of coupling to the position pointing device as is provided by a center portion of the two dimensional sensor to the position pointing device.

11. The circuit board arrangement of claim 10 wherein the electrical conductor means includes a mesh of electrical conductors maintained at a DC reference potential and located just beyond the edge portion outside of the sensor.

12. The circuit board arrangement of claim 11 wherein the two dimensional sensor includes an array of sensor lines extending in X and Y coordinate directions.

13. The circuit board arrangement of claim 12 wherein the mesh of electrical conductors includes dummy electrical conductor sensor lines maintained at the reference potential and extending in the X and Y directions just beyond the edge portion outside of the two dimensional sensor.

14. The circuit board arrangement of claim 13 wherein adjacent pairs of the coordinate lines extending in the X direction are spaced from each other by a predetermined interval, adjacent pairs of the dummy sensor lines extending in the X direction being spaced from each other by the predetermined interval.

15. The circuit board arrangement of claim 14 wherein adjacent pairs of the coordinate lines extending in the Y direction are spaced from each other by a set interval, adjacent pairs of the dummy sensor lines extending in the Y direction being spaced from each other by the set interval.

16. The circuit board arrangement of claim 10 wherein the two dimensional sensor includes mutually insulated electrically conducting lines selectively connected to an AC source for enabling the position of the position pointing device to be detected in two coordinate directions, the electrical conductor means including further spaced electrically conducting lines maintained at a DC reference potential and located just beyond the edge portion outside of the two dimensional sensor.

17. The circuit board arrangement of claim 16 wherein the further conducting lines extend in the two coordinate directions.

18. A circuit board arrangement for a coordinate detecting apparatus comprising a two dimensional sensor on the circuit board arrangement for a position pointing device, other circuit elements on the circuit board arrangement at a region removed from the two dimensional sensor, the other circuit elements and the two dimensional sensor being positioned on the circuit board arrangement so electromagnetic wave noise has a tendency to propagate between the other circuit elements and the two dimensional sensor, and electrical conductor means on the circuit board arrangement for substantially blocking propagation of the electromagnetic wave noise between the other circuit elements and the two dimensional sensor and thereby substantially overcome said tendency, said electrical conductor means including spaced electrically conducting dummy lines maintained at a DC reference potential and located just beyond an edge portion of the two dimensional sensor and outside of the two dimensional sensor.

19. The circuit board arrangement of claim 18 wherein the two dimensional sensor includes sensor lines extending in the X and Y directions, the sensor lines extending in the X and Y directions being mutually insulated from each other, the sensor lines extending in the X and Y directions being on different parallel planar faces, the dummy lines being on one of the faces, signal lines being on another of the faces.

20. The circuit board arrangement of claim 19 wherein the signal lines are beyond the edge portion and outside of the two dimensional sensor and are substantially aligned with the dummy lines.

21. The circuit board arrangement of claim 20 wherein said electrical conductor means includes another set of spaced electrically conducting dummy lines on a further planar face parallel to said different parallel planar faces, the another set being aligned with the signal lines, the planar face including the signal lines being between the different parallel planar faces including the dummy lines.

22. The circuit board arrangement of claim 18 wherein said electrical conductor means includes another set of spaced electrically conducting dummy lines on a further planar face parallel to said different parallel planar faces, the planar face including the signal lines being between the different parallel planar faces including the dummy lines.

23. The circuit board arrangement of claim 18 wherein the dummy lines include a mesh of electrical conductors maintained at a DC reference potential and located just beyond the edge portion outside of the two dimensional sensor.

24. The circuit board arrangement of claim 23 wherein the two dimensional sensor includes an array of sensor lines extending in X and Y coordinate directions, the mesh of electrical conductors including dummy electrical conductor sensor lines connected to the reference potential and extending in the X and Y directions just beyond the edge portion outside of the two dimensional sensor.

25. The circuit board arrangement of claim 24 wherein adjacent pairs of the coordinate lines extending in the X direction are spaced from each other by a predetermined interval, adjacent pairs of the dummy sensor lines extending in the X direction being spaced from each other by the predetermined interval.

26. The circuit board arrangement of claim 25 wherein adjacent pairs of the coordinate lines extending in the Y direction are spaced from each other by a set interval, adjacent pairs of the dummy sensor lines extending in the Y directions being spaced from each other by the set interval.

* * * * *